US012272853B2

(12) United States Patent
Tokuda et al.

(10) Patent No.: US 12,272,853 B2
(45) Date of Patent: Apr. 8, 2025

(54) DIRECTIONAL COUPLER

(71) Applicant: Murata Manufacturing Co., Ltd., Kyoto (JP)

(72) Inventors: Daisuke Tokuda, Kyoto (JP); Yasushi Shigeno, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 229 days.

(21) Appl. No.: 18/054,626

(22) Filed: Nov. 11, 2022

(65) Prior Publication Data

US 2023/0076275 A1 Mar. 9, 2023

Related U.S. Application Data

(63) Continuation of application No. PCT/JP2021/015493, filed on Apr. 14, 2021.

(30) Foreign Application Priority Data

May 29, 2020 (JP) ................................ 2020-094544

(51) Int. Cl.
*H01P 1/213* (2006.01)
*H01P 5/18* (2006.01)

(52) U.S. Cl.
CPC ................ *H01P 1/213* (2013.01); *H01P 5/18* (2013.01); *H01P 5/184* (2013.01); *H01P 5/185* (2013.01)

(58) Field of Classification Search
CPC .......... H01P 5/187; H01P 1/213; H01P 1/127; H01P 5/184; H01P 5/18; H01P 5/185
USPC ......... 333/101, 109, 110, 112, 116, 118, 262
See application file for complete search history.

(56) References Cited

U.S. PATENT DOCUMENTS

2017/0230066 A1 8/2017 Little et al.
2019/0097297 A1 3/2019 Ishihara
2021/0013858 A1 1/2021 Tokuda et al.

FOREIGN PATENT DOCUMENTS

JP 2019-062309 A 4/2019
WO 2019/189232 A1 10/2019

OTHER PUBLICATIONS

International Search Report for PCT/JP2021/015493 dated Jun. 29, 2021.

*Primary Examiner* — Rakesh B Patel
(74) *Attorney, Agent, or Firm* — MCDONALD HOPKINS LLC

(57) ABSTRACT

A directional coupler includes a main line, a sub line electromagnetically coupled to the main line, a coupling output terminal, a first filter connected to one end of the sub line, and a second filter connected to the one end of the sub line and the coupling output terminal and having a pass band different from that of the first filter. The first filter and the second filter are constituent elements of a multiplexer. The first filter is terminated.

11 Claims, 10 Drawing Sheets

DIRECTIONAL COUPLER

CROSS REFERENCE TO RELATED APPLICATION

This is a continuation of International Application No. PCT/JP2021/015493 filed on Apr. 14, 2021 which claims priority from Japanese Patent Application No. 2020-094544 filed on May 29, 2020. The contents of these applications are incorporated herein by reference in their entireties.

BACKGROUND ART

Technical Field

The present disclosure relates to a directional coupler.

For example, Patent Document 1 discloses a directional coupler including a main line and a sub line. A variable filter circuit including a plurality of filters is connected between the sub line of the directional coupler and a coupling port.

Patent Document 1: International Publication No. 2019/189232

BRIEF SUMMARY

In the conventional directional coupler described above, desired signals can be extracted with some degree of accuracy by using a filter that allows only the desired signals to pass therethrough. However, the conventional directional coupler has a problem that unwanted signals other than the desired signals are reflected by the filter and returned to the sub line.

The unwanted signals returned to the sub line return to the main line due to coupling between the sub line and the main line. The unwanted signals returned to the main line may cause an error in the power of the desired signals, and as a result, the desired signals cannot be extracted with high accuracy.

The present disclosure provides a directional coupler capable of extracting desired signals with high accuracy.

A directional coupler according to an aspect of the present disclosure includes a main line, a sub line electromagnetically coupled to the main line, an output terminal, a first filter connected to one end of the sub line, and a second filter connected to the one end of the sub line and the output terminal and having a pass band different from a pass band of the first filter, in which the first filter and the second filter are constituent elements of a multiplexer, and the first filter is terminated.

According to the directional coupler of the present disclosure, desired signals can be extracted with high accuracy.

DETAILED DESCRIPTION

Hereinafter, directional couplers according to embodiments of the present disclosure will be described in detail with reference to the accompanying drawings. Note that all of the embodiments described below are specific examples of the present disclosure. Thus, numerical values, shapes, materials, constituent elements, arrangement and connection configurations of the constituent elements, steps, order of the steps, and the like described in the following embodiments are mere examples, and are not intended to limit the present disclosure. Therefore, among the constituent elements in the following embodiments, constituent elements not described in the independent claims are described as optional constituent elements.

The figures are schematic diagrams and are not necessarily strictly illustrated. Thus, for example, scales and the like are not necessarily the same in the figures. In the figures, substantially the same components are denoted by the same reference symbols, and redundant description will be omitted or simplified.

In this specification, terms indicating a relationship between elements such as same and equal, and numerical ranges are not expressions that express only strict meanings, but mean substantially equivalent ranges including, for example, differences of about several percent.

In the description of the circuit configuration of the present disclosure, "directly connected" means directly connected by a connection terminal and/or a wiring conductor without necessarily interposing another circuit element. On the other hand, "connected" means not only directly connected by a connection terminal and/or a wiring conductor, but also electrically connected via another circuit element. Further, "connected between A and B" means connected to both A and B between A and B.

Embodiment 1

[1-1. Configuration]

Figure 1:
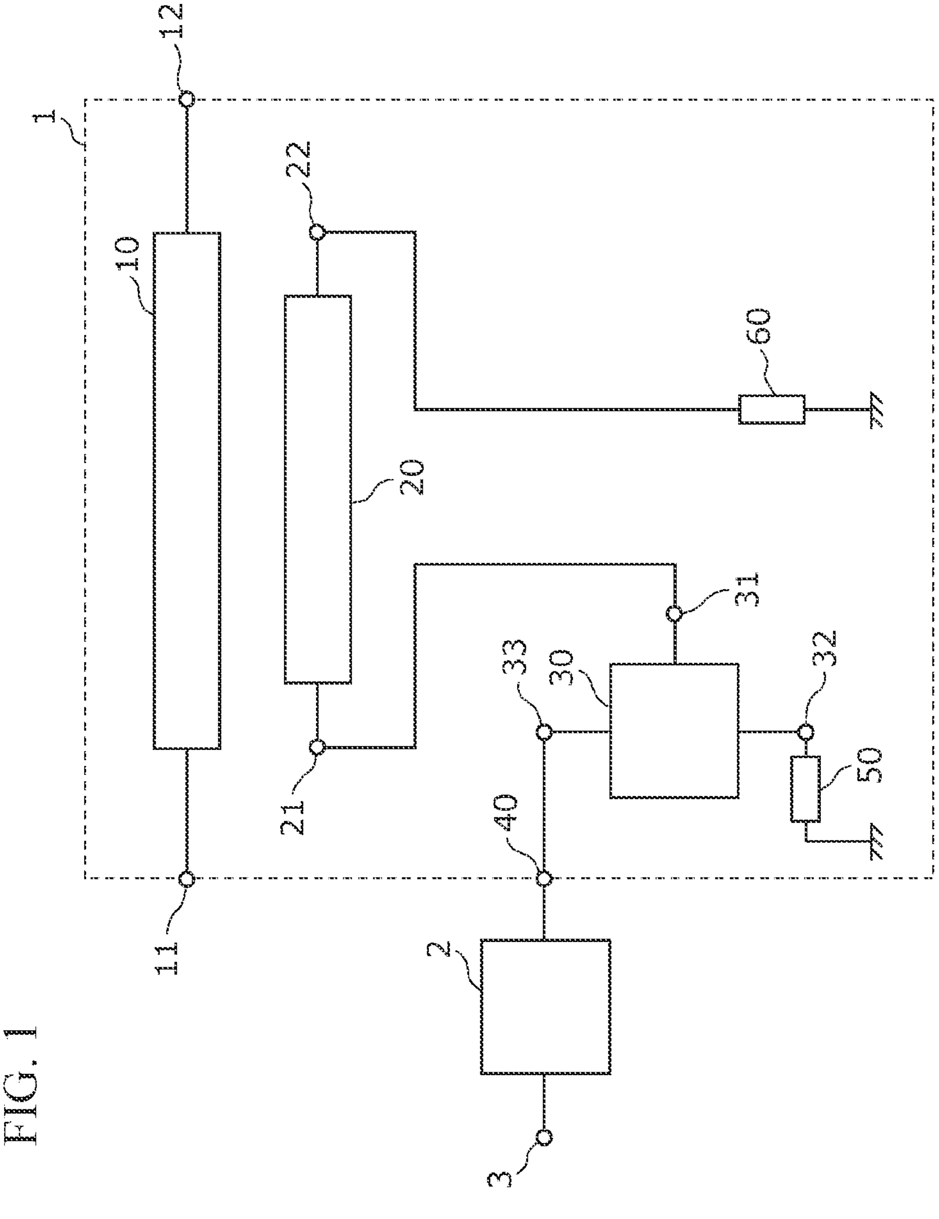
FIG. 1 is a diagram illustrating a configuration of a directional coupler according to Embodiment 1.

First, a configuration of a directional coupler according to Embodiment 1 will be described with reference to FIG. 1. FIG. 1 is a diagram illustrating a configuration of a directional coupler 1 according to the embodiment.

As illustrated in FIG. 1, the directional coupler 1 includes a main line 10, a sub line 20, a diplexer 30, a coupling output terminal 40, and termination circuits 50 and 60. The main line 10 and the sub line 20 are electromagnetically coupled to each other.

The main line 10 has two input/output terminals 11 and 12. The input/output terminal 11 is connected to at least one of a transmission circuit that generates a high frequency signal for transmission and a reception circuit that processes high frequency signals received by an antenna (not illustrated). The input/output terminal 12 is connected to an antenna. The input/output terminal 11 may be connected to an antenna, and the input/output terminal 12 may be connected to a transmission circuit or a reception circuit.

The sub line 20 has one end 21 and another end 22. The one end 21 is connected to the coupling output terminal 40 via the diplexer 30. Specifically, a common terminal 31 of the diplexer 30 is connected to the one end 21. The termination circuit 60 is connected to the other end 22.

The diplexer 30 is an example of a multiplexer including two filters having different pass bands from each other. The diplexer 30 has the common terminal 31, a first output terminal 32, and a second output terminal 33. The diplexer 30 is configured to allow only signals within specific frequency bands to pass between the common terminal 31 and the first output terminal 32 and between the common terminal 31 and the second output terminal 33, respectively. Specifically, among signals input to the common terminal 31, the diplexer 30 outputs signals within a desired frequency band through the second output terminal 33 and outputs signals within an unwanted frequency band through the first output terminal 32.

A first filter connected to the one end 21 of the sub line 20 is connected between the common terminal 31 and the first output terminal 32. The first filter is terminated by the termination circuit 50. In the embodiment, the first filter is directly connected to the termination circuit 50.

A second filter having a pass band different from that of the first filter is disposed between the common terminal 31 and the second output terminal 33. The second filter is connected to the one end 21 of the sub line 20 and the coupling output terminal 40. A specific configuration of the diplexer 30 including the first filter and the second filter will be described later.

The coupling output terminal 40 is connected to the second output terminal 33 of the diplexer 30. A detector 2 is connected to the coupling output terminal 40.

The termination circuit 50 is connected to the first output terminal 32 of the diplexer 30. The termination circuit 50 is adjusted to a predetermined value so as to absorb and consume the signals that pass through the first filter.

The termination circuit 60 is connected to the other end 22 of the sub line 20. The termination circuit 60 is adjusted to a predetermined value so as to absorb and consume signals with a fundamental frequency f0, which are the high frequency signals transmitted through the main line 10. The termination circuit 60 is, for example, a 50Ω resistor.

The directional coupler 1 configured as described above is used to detect high frequency signals transmitted through the main line 10. The high frequency signal is a signal complying with a communication standard, such as Wi-Fi (registered trademark), long term evolution (LTE), or 5th generation (5G). The directional coupler 1 is disposed, for example, in a front end portion of a multimode/multiband cellular phone.

Some of the high frequency signals transmitted through the main line 10 are output to the detector 2 via the sub line 20, the diplexer 30, and the coupling output terminal 40. The detector 2 detects the signal power or the like of the input signals and outputs the detection result from a detection result output terminal 3.

The detection result output terminal 3 is connected to, for example, a transmission circuit, a reception circuit, or a control circuit of these circuits. This allows appropriate control of processing related to transmission or reception, such as changing the amplification factor of the amplifier included in the transmission circuit or the reception circuit to an appropriate value based on the detection result. By increasing the detection accuracy, the accuracy and reliability of various controls can be increased.

[1-2. Configuration and Frequency Characteristics of Diplexer]

Next, a specific configuration and frequency characteristics of the diplexer 30 will be described with reference to FIGS. 2 and 3.

Figure 2:
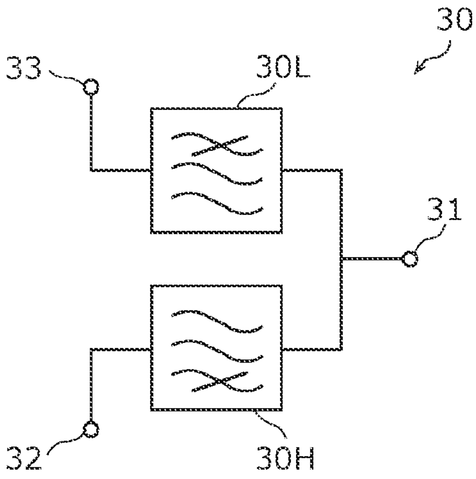
FIG. 2 is a diagram illustrating an example of a diplexer included in the directional coupler according to Embodiment 1.

FIG. 2 is a diagram illustrating the diplexer 30 included in the directional coupler 1 according to the embodiment. As illustrated in FIG. 2, the diplexer 30 includes a high pass filter 30H and a low pass filter 30L.

The high pass filter 30H is an example of the first filter connected to the one end 21 of the sub line 20. The high pass filter 30H is connected to the common terminal 31 and the first output terminal 32. The first output terminal 32 is connected to the termination circuit 50. That is, the high pass filter 30H is terminated. In the embodiment, the high pass filter 30H is directly connected to the termination circuit 50. No branch is provided in the path between the high pass filter 30H and the termination circuit 50.

The high pass filter 30H passes signals with frequencies equal to or higher than fh and cuts off signals with frequencies lower than fh. The frequency fh is a corner frequency fc of the high pass filter 30H. The corner frequency fc is also referred to as a cutoff frequency. The corner frequency fc corresponds to a frequency at which the insertion loss is approximately 3 dB in the frequency characteristics of the high pass filter 30H. The corner frequency fc is also used synonymously in a low pass filter, a band pass filter, and a band elimination filter, which will be described later.

Signals input through the common terminal 31 and passing through the high pass filter 30H are absorbed and consumed by the termination circuit 50. In other words, the signals passing through the high pass filter 30H are not reflected by the first output terminal 32, the termination circuit 50, and the like and do not return to the sub line 20.

The low pass filter 30L is an example of the second filter connected to the one end 21 of the sub line 20 and the coupling output terminal 40. The low pass filter 30L is connected to the common terminal 31 and the second output terminal 33. The second output terminal 33 is connected to the coupling output terminal 40.

The low pass filter 30L passes signals with frequencies equal to or lower than f1 and cuts off signals with frequencies higher than f1. The frequency f1 is a corner frequency fc of the low pass filter 30L. The signals input through the common terminal 31 and passing through the low pass filter 30L are input to the detector 2 via the second output terminal 33 and the coupling output terminal 40.

Figure 3:
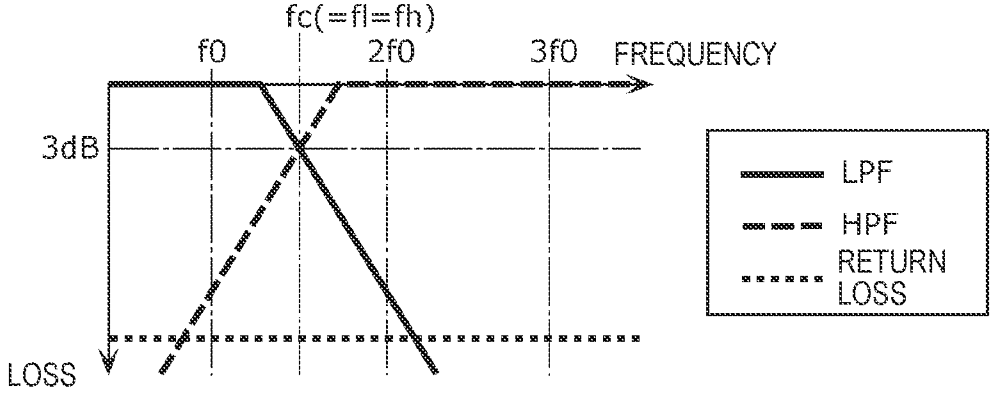
FIG. 3 is a diagram showing frequency characteristics of the diplexer illustrated in FIG. 2.

FIG. 3 is a diagram showing frequency characteristics of the diplexer 30 illustrated in FIG. 2. In FIG. 3, the horizontal axis represents the frequency, and the vertical axis represents the insertion loss. A thick dashed line in FIG. 3 represents the frequency characteristic of the insertion loss between the common terminal 31 and the first output terminal 32, that is, the frequency characteristic of the high pass filter 30H. A thick solid line in FIG. 3 represents the frequency characteristic of the insertion loss between the common terminal 31 and the second output terminal 33, that is, the frequency characteristic of the low pass filter 30L.

The pass bands of the high pass filter 30H and the low pass filter 30L included in the diplexer 30 are complementary to each other. Specifically, the corner frequency fh of the high pass filter 30H is equal to the corner frequency f1 of the low pass filter 30L. Here, "equal" does not only means exactly the same, but also includes cases in which there is an error of approximately 10%. In other words, the corner frequency fh of the high pass filter 30H and the corner frequency f1 of the low pass filter 30L need not be exactly the same, as long as these corner frequencies can be considered substantially equal. The same applies to the relationship between the band elimination filter and the band pass filter, which will be described later.

As shown in FIG. 3, the corner frequency fc (=fh=f1) is larger than the fundamental frequency f0 and smaller than a second harmonic frequency 2*f*0. The fundamental frequency f0 is a frequency of a fundamental wave of the high frequency signal transmitted through the main line 10. In other words, the fundamental frequency f0 is a frequency of the desired signals to be detected by the detector 2. On the other hand, the second harmonic frequency 2*f*0 and a third harmonic frequency 3*f*0 are frequencies of unwanted signals that should not be input to the detector 2.

Based on the frequency characteristics shown in FIG. 3, the desired signals, which are the fundamental wave, among signals input to the common terminal 31 pass through the low pass filter 30L and are input to the detector 2. The second harmonic wave and the third harmonic wave pass through the high pass filter 30H and are absorbed and consumed by the termination circuit 50. The second harmonic wave and the third harmonic wave do not pass through the low pass filter 30L and are not reflected.

In FIG. 3, a return loss viewed from the common terminal 31 side is also shown by a thick dotted line. As shown in FIG. 3, the corner frequencies fc of the high pass filter 30H and the low pass filter 30L are the same, so the return loss is suppressed to be sufficiently small in the entire frequency band. That is, the signal return to the sub line 20 due to reflection by the diplexer 30*a* is sufficiently suppressed.

Figure 4:
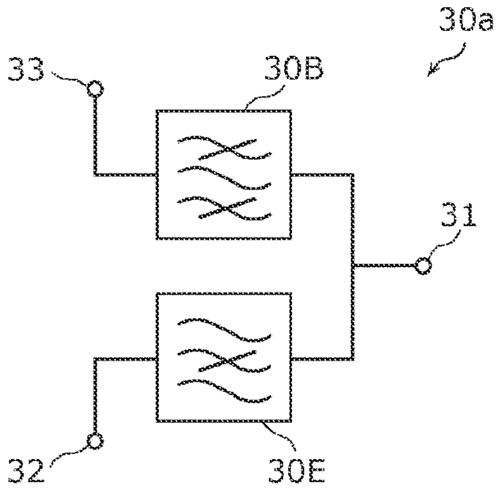
FIG. 4 is a diagram illustrating another example of a diplexer included in the directional coupler according to Embodiment 1.

The directional coupler 1 may include a diplexer 30*a* illustrated in FIG. 4 instead of the diplexer 30 illustrated in FIG. 2. FIG. 4 is a diagram illustrating the diplexer 30*a* included in the directional coupler 1 according to the embodiment. As illustrated in FIG. 4, the diplexer 30*a* includes a band elimination filter 30E and a band pass filter 30B.

The band elimination filter 30E is an example of the first filter connected to the one end 21 of the sub line 20. The band elimination filter 30E is connected to the common terminal 31 and the first output terminal 32.

The band elimination filter 30E passes signals with frequencies equal to or lower than fe1 and signals with frequencies equal to or higher than fe2, and cuts off signals with frequencies higher than fe1 and lower than fe2. The frequency fe1 is a corner frequency fc1 of the band elimination filter 30E on the low frequency side. The frequency fe2 is a corner frequency fc2 of the band elimination filter 30E on the high frequency side.

Signals input through the common terminal 31 and passing through the band elimination filter 30E are absorbed and consumed by the termination circuit 50 via the first output terminal 32. In other words, the signals passing through the band elimination filter 30E are not reflected by the first output terminal 32, the termination circuit 50, and the like and do not return to the sub line 20.

The band pass filter 30B is an example of the second filter connected the one end 21 of the sub line 20 and the coupling output terminal 40. The band pass filter 30B is connected to the common terminal 31 and the second output terminal 33.

The band pass filter 30B passes signals with frequencies equal to or higher than fb1 and equal to or lower than fb2, and cuts off signals with frequencies lower than fb1 and signals with frequencies higher than fb2. The frequency fb1 is a corner frequency fc1 of the band pass filter 30B on the low frequency side. The frequency fb2 is a corner frequency fc2 of the band pass filter 30B on the high frequency side.

Figure 5:
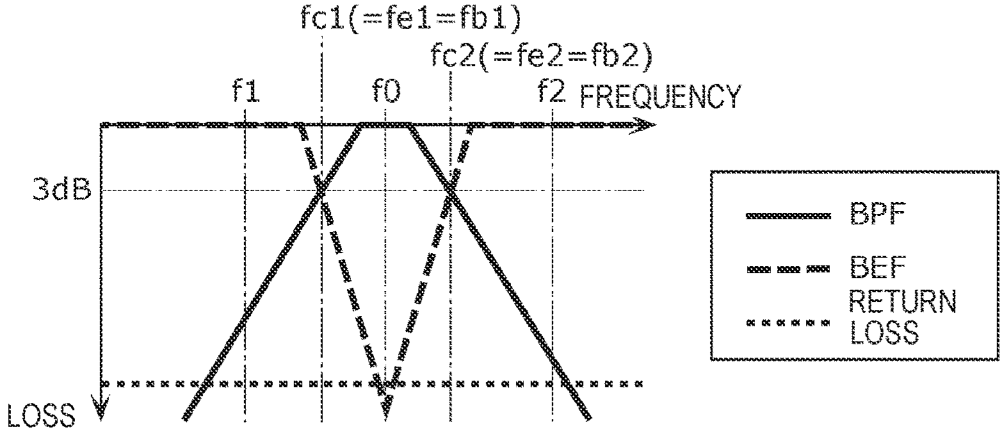
FIG. 5 is a diagram showing frequency characteristics of the diplexer illustrated in FIG. 4.

FIG. 5 is a diagram showing frequency characteristics of the diplexer 30*a* illustrated in FIG. 4. In FIG. 5, the horizontal axis represents the frequency, and the vertical axis represents the insertion loss. A thick dashed line in FIG. 5 represents the frequency characteristic of the insertion loss between the common terminal 31 and the first output terminal 32, that is, the frequency characteristic of the band elimination filter 30E. A thick solid line in FIG. 5 represents the frequency characteristic of the insertion loss between the common terminal 31 and the second output terminal 33, that is, the frequency characteristic of the band pass filter 30B.

The pass bands of the band elimination filter 30E and the band pass filter 30B included in the diplexer 30*a* are complementary to each other. Specifically, the corner frequencies fe1 and fe2 of the band elimination filter 30E are equal to the corner frequencies fb1 and fb2 of the band pass filter 30B, respectively.

As shown in FIG. 5, the pass band of the band pass filter 30B (from fb1 to fb2) includes the fundamental frequency f0. That is, the corner frequency fb1 (=fe1) of the band pass filter 30B on the low frequency side is smaller than the fundamental frequency f0. The corner frequency fb2 (=fe2) of the band pass filter 30B on the high frequency side is larger than the fundamental frequency f0. The frequencies f1 and f2 of the unwanted signals are included within the pass bands of the band elimination filter 30E.

In FIG. 5, a return loss viewed from the common terminal 31 side is also shown by a thick dotted line. As shown in FIG. 5, the two corner frequencies fc1 and fc2 of the band elimination filter 30E and the band pass filter 30B are both the same, so the return loss is kept sufficiently small over the entire frequency band. That is, the signal return to the sub line 20 due to reflection by the diplexer 30*a* is sufficiently suppressed.

Each of the high pass filter 30H, the low pass filter 30L, the band pass filter 30B, and the band elimination filter 30E is an LC filter including a capacitor and an inductor. Alternatively, at least one of the high pass filter 30H, the low pass filter 30L, the band pass filter 30B, and the band elimination filter 30E may include an acoustic wave filter such as a surface acoustic wave (SAW) filter or a bulk acoustic wave (BAW) filter. Alternatively, at least one of the high pass filter 30H, the low pass filter 30L, the band pass filter 30B, and the band elimination filter 30E may be a filter formed in an integrated passive device (IPD).

[1-3. Signal Flow in Directional Coupler]

Next, the signal flow in the directional coupler 1 according to the embodiment will be described. Effects of the directional coupler 1 according to the embodiment will also be described below in comparison with a directional coupler 1*x* according to a comparative example illustrated in FIG. 6.

Figure 6:
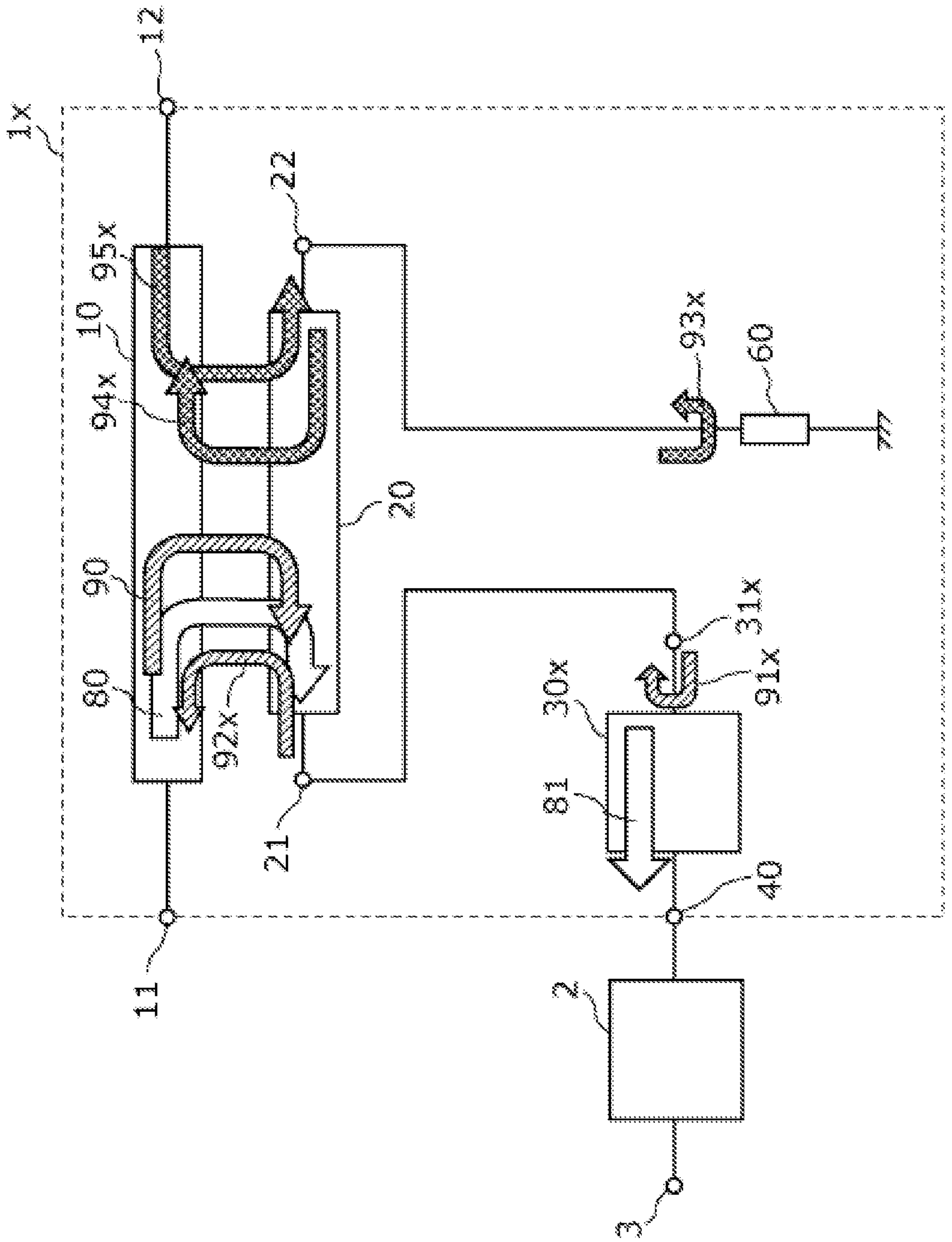
FIG. 6 is a diagram for explaining signals flowing through a directional coupler according to a comparative example.
Figure 7:
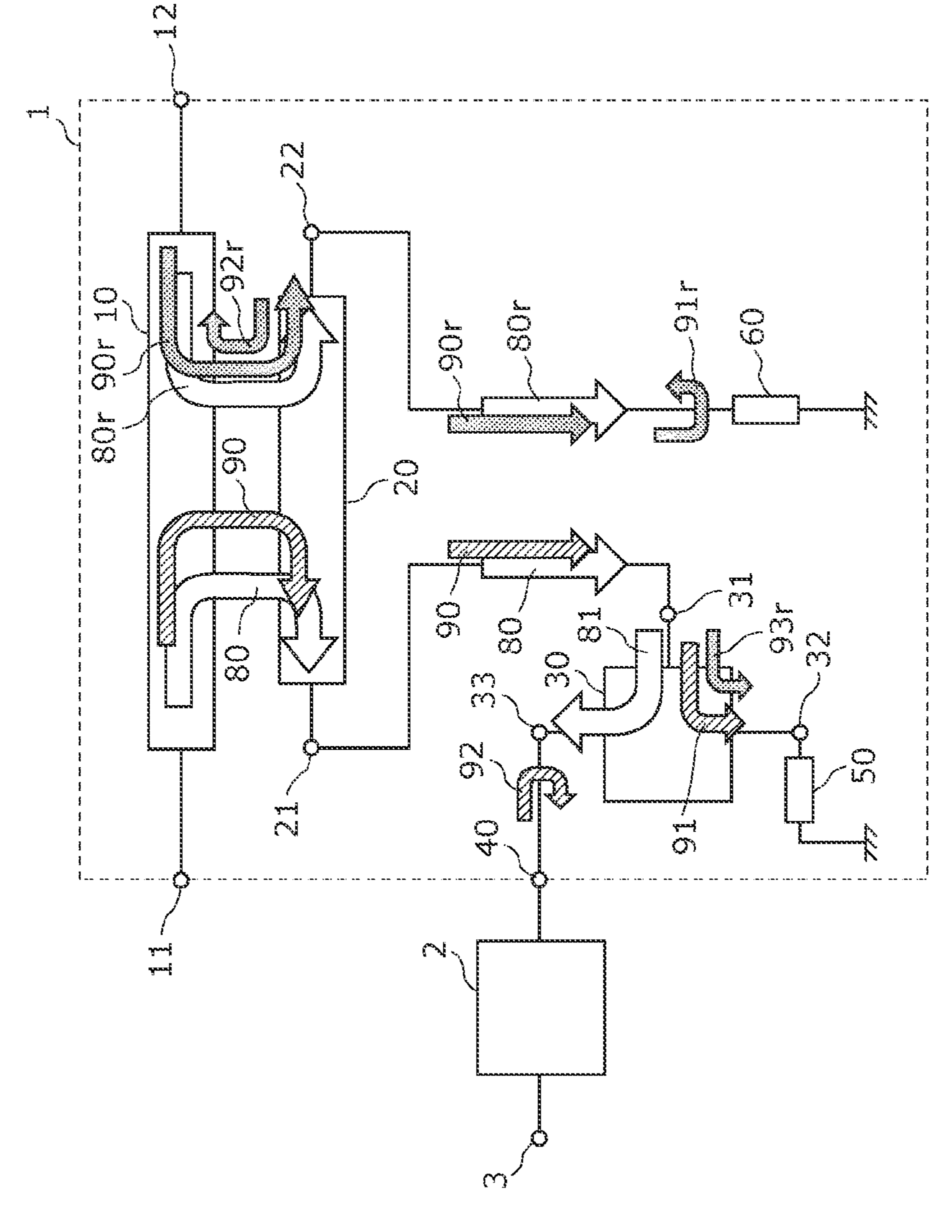
FIG. 7 is a diagram for explaining signals flowing through the directional coupler according to Embodiment 1.

FIG. 6 is a diagram for explaining signals flowing in the directional coupler 1*x* according to the comparative example. FIG. 7 is a diagram for explaining signals flowing in the directional coupler 1 according to the embodiment. As illustrated in FIG. 6, the directional coupler 1*x* according to the comparative example is different from the directional coupler 1 according to the embodiment in that a filter 30*x* is provided instead of the diplexer 30. The filter 30*x* is, for example, a low pass filter, and passes desired signals to be detected by the detector 2. The directional coupler 1*x* according to the comparative example does not include the termination circuit 50.

In the following description, it is assumed that high frequency signals are transmitted through the main line 10 from the input/output terminal 11 to the input/output terminal 12. As illustrated in FIGS. 6 and 7, some of the high frequency signals transmitted through the main line 10 flow through the sub line 20 as coupled signals due to electromagnetic coupling between the main line 10 and the sub line 20. The coupled signals include fundamental wave signals 80 with the fundamental frequency f0, which are the high frequency signals, and unwanted wave signals 90 other than the fundamental wave signals 80. The unwanted wave signal 90 is, for example, a signal including a harmonic wave.

In the directional coupler 1*x* illustrated in FIG. 6, both the fundamental wave signals 80 and the unwanted wave signals 90 are input through the one end 21 of the sub line 20 to an input terminal 31*x* of the filter 30*x*. The filter 30*x* passes the fundamental wave signals 80, so fundamental wave signals 81 passing through the filter 30*x* are input to the detector 2. This allows the detector 2 to perform detection using the fundamental wave signals 81.

On the other hand, the unwanted wave signals 90 cannot pass through the filter 30*x*, are reflected by the filter 30*x*, and return to the sub line 20 as unwanted wave signals 91*x*. Some of the unwanted wave signals 91*x* returned to the sub line 20 return to the main line 10 as unwanted wave coupled signals 92*x* due to electromagnetic coupling between the sub line 20 and the main line 10.

Some of the unwanted wave signals 91*x* reach the termination circuit 60 through the other end 22 of the sub line 20. The termination circuit 60 is typically tuned to absorb and consume signals with the fundamental frequency f0. Unwanted wave signals 93*x* reaching the termination circuit 60 are signals with frequencies different from the fundamental frequency f0, so the unwanted wave signals 93X are reflected by the termination circuit 60 and return to the sub line 20 again. The unwanted wave signals 93*x* returned to the sub line 20 pass through the sub line 20 and are reflected again by the filter 30*x*. Thus, multiple reflection of the unwanted waves occurs at the end portions of the sub line 20 due to the unwanted wave signals 90.

Some of the unwanted wave signals 93*x* returned to the sub line 20 return to the main line 10 as unwanted wave coupled signals 94*x* due to electromagnetic coupling between the sub line 20 and the main line 10. Some of the unwanted wave coupled signals 94*x* returned to the main line 10 reach the antenna (not illustrated) through the input/output terminal 12, are reflected by the antenna, and return to the main line 10 again. Then, due to the electromagnetic coupling between the main line 10 and the sub line 20, some of the unwanted wave coupled signals 94*x* return to the sub line 20 as unwanted wave coupled signals 95*x*. The unwanted wave coupled signals 95*x* returned to the sub line 20 cause multiple reflection at the end portions of the sub line 20, similar to the unwanted wave signals 90.

As described above, the unwanted wave signals 91*x* reflected by the filter 30*x* cause multiple reflection, and cause return of the unwanted waves to the main line 10. The reflection causes unwanted ripples or spurious responses to the filter characteristics, so the frequency characteristics of the detection output of the desired signals are deteriorated. Thus, the desired signals cannot be extracted through the coupling output terminal 40 with high accuracy, and the accuracy of detection by the detector 2 is degraded.

In contrast, in the directional coupler 1 according to the embodiment, as illustrated in FIG. 7, the diplexer 30 is connected to the one end 21 of the sub line 20. The first output terminal 32 of the diplexer 30 is connected to the termination circuit 50. The diplexer 30 is configured such that the unwanted wave signals 90 pass between the common terminal 31 and the first output terminal 32.

Thus, the unwanted wave signals 90 pass through the first filter (to be specific, the high pass filter 30H) of the diplexer 30. Unwanted wave signals 91 passing through the diplexer 30 reach the termination circuit 50 via the first output terminal 32. The termination circuit 50 is configured to absorb and consume the unwanted wave signals 91, so the unwanted wave signals 91 are absorbed and consumed without necessarily being reflected. That is, the unwanted wave signals 90 are not reflected by the common terminal 31 of the diplexer 30, so the multiple reflection as described with reference to FIG. 6 does not occur. Thus, deterioration of the filter characteristics can be suppressed, and the desired signals can be extracted through the coupling output terminal 40 with high accuracy.

The fundamental wave signals 80 input to the common terminal 31 pass through the second filter (to be specific, the low pass filter 30L) of the diplexer 30 and are input to the detector 2 via the second output terminal 33 and the coupling output terminal 40. Signals other than the fundamental wave signals 80 do not pass through the low pass filter 30L, so the accuracy of detection in the detector 2 can be enhanced.

In the detector 2, the impedance changes depending on the polarities and voltages of the fundamental wave signals 80 to be detected, so distortions occur in principle when the fundamental wave signals 80 to be detected are input. The distortions that occur often include harmonic waves of the fundamental wave signals 80. The distortions generated in the detector 2 begin to return to the sub line 20 side as distortion signals 92. However, the distortion signals 92 have frequencies different from the fundamental wave signals 81, the distortion signals 92 do not pass through the filter 30*x*. Thus, the return of the distortion signals 92 to the sub line 20 and then to the main line 10 can be suppressed.

Although FIG. 7 illustrates an example in which the directional coupler 1 includes the diplexer 30, the directional coupler 1 including the diplexer 30*a* illustrated in FIG. 4 can also extract the desired signals through the coupling output terminal 40 with high accuracy.

[1-4. Effects, Etc.]

As described above, the directional coupler 1 according to the embodiment includes the main line 10, the sub line 20 electromagnetically coupled to the main line 10, the coupling output terminal 40, the first filter connected to the one end 21 of the sub line 20, and the second filter connected to the one end 21 of the sub line 20 and the coupling output terminal 40 and having the pass band different from that of the first filter, and the first filter is terminated.

This allows unwanted signals that pass through the first filter to be absorbed and consumed, thereby suppressing the return of signals within the pass band of the first filter to the sub line 20. Accordingly, the occurrence of multiple reflection and the like in the sub line 20 can be suppressed, and thus the deterioration of the filter characteristics can be suppressed. Thus, the desired signals that pass through the second filter can be extracted through the coupling output terminal 40 with high accuracy. In addition, by suppressing the return of the unwanted waves to the main line 10, the occurrence of an obstacle to the transmitter operation such as the occurrence of unwanted reflection or intermodulation distortion.

In the main line 10, not only traveling waves traveling from the input/output terminal 11 to the input/output terminal 12 but also reflected waves traveling from the input/output terminal 12 to the input/output terminal 11 are transmitted. As illustrated in FIG. 7, the reflected waves are also extracted as reflected wave coupled signals to the sub line 20 by electromagnetic coupling between the main line 10 and the sub line 20. The reflected wave coupled signals include reflected fundamental wave signals 80*r* with the fundamental frequency f0 and reflected unwanted wave signals 90*r* other than the reflected fundamental wave signals 80*r*.

Here, the directional coupler 1 according to the embodiment further includes the termination circuit 60 connected to the other end 22 of the sub line 20.

Thus, the reflected fundamental wave signals 80*r* reach the termination circuit 60 through the other end 22 of the sub line 20, and are absorbed and consumed by the termination circuit 60. Thus, the reflected fundamental wave signals 80*r* returning to the sub line 20 and then reaching the coupling output terminal 40 can be suppressed, so that the desired fundamental wave signals 81 can be extracted with high accuracy.

The impedance of the termination circuit 60 is adjusted so that the reflected fundamental wave signals 80*r* with the fundamental frequency f0 can be appropriately absorbed and consumed. Thus, the reflected unwanted wave signals 90*r* cannot be absorbed and consumed by the termination circuit 60 and are reflected. Reflected unwanted wave signals 91*r* return to the sub line 20, and then some of the reflected unwanted wave signals 91*r* return to the main line 10 as reflected unwanted wave coupled signals 92*r*, but the rest of the reflected unwanted wave signals 91*r* reach the diplexer 30 through the sub line 20 and pass through the first filter of the diplexer 30.

Reflected unwanted wave signals 93*r* passing through the first filter of the diplexer 30 reach the termination circuit 50 via the first output terminal 32. The reflected unwanted wave signals 93*r* are absorbed and consumed by the termination circuit 50, so the reflected unwanted wave signals 93*r* do not return to the sub line 20 again. Thus, multiple reflection due to the reflected unwanted wave signals 90*r* based on the reflected waves can be suppressed, and thus deterioration of the filter characteristics can be suppressed.

The reflected unwanted wave signals 91*r* do not include the fundamental frequency f0, so that the reflected unwanted wave signals 91*r* do not pass through the second filter and do not reach the coupling output terminal 40. Accordingly, the signals extracted through the coupling output terminal 40 do not include the reflected unwanted wave signals 91*r*, so the fundamental wave signals 81 can be extracted with high accuracy.

For example, the corner frequency of the first filter is equal to the corner frequency of the second filter.

As described above, the corner frequency fc is the frequency at which the insertion loss of the filter is approximately 3 dB. The insertion loss of approximately 3 dB means that the signal strength is approximately halved. Thus, the corner frequencies fc of the two filters are equal to each other, so that approximately half of signals with the frequency fc, which are input to the common terminal 31, can pass through one of the two filters and the rest can pass through the other filter. Thus, the reflection of the signals by the two filters can be suppressed, and the signal return to the sub line 20 can be suppressed.

For example, the first filter and the second filter are constituent elements of the diplexer 30 or the 30*a*.

This allows the coupled signals input to the common terminal 31 to be separated into the fundamental wave signals 81 and the unwanted wave signals 91 with high accuracy. By using the diplexer 30 or 30*a*, separation accuracy can be improved and the occurrence of distortion can be suppressed more strongly.

Embodiment 2

Next, Embodiment 2 will be described.

A directional coupler according to Embodiment 2 is different from that of Embodiment 1 mainly in that a switch circuit is newly provided and that the termination circuit connected to the other end of the sub line is a variable termination circuit. In the following, differences from Embodiment 1 will be mainly described, and description of common features will be omitted or simplified.

[2-1. Configuration]

Figure 8:
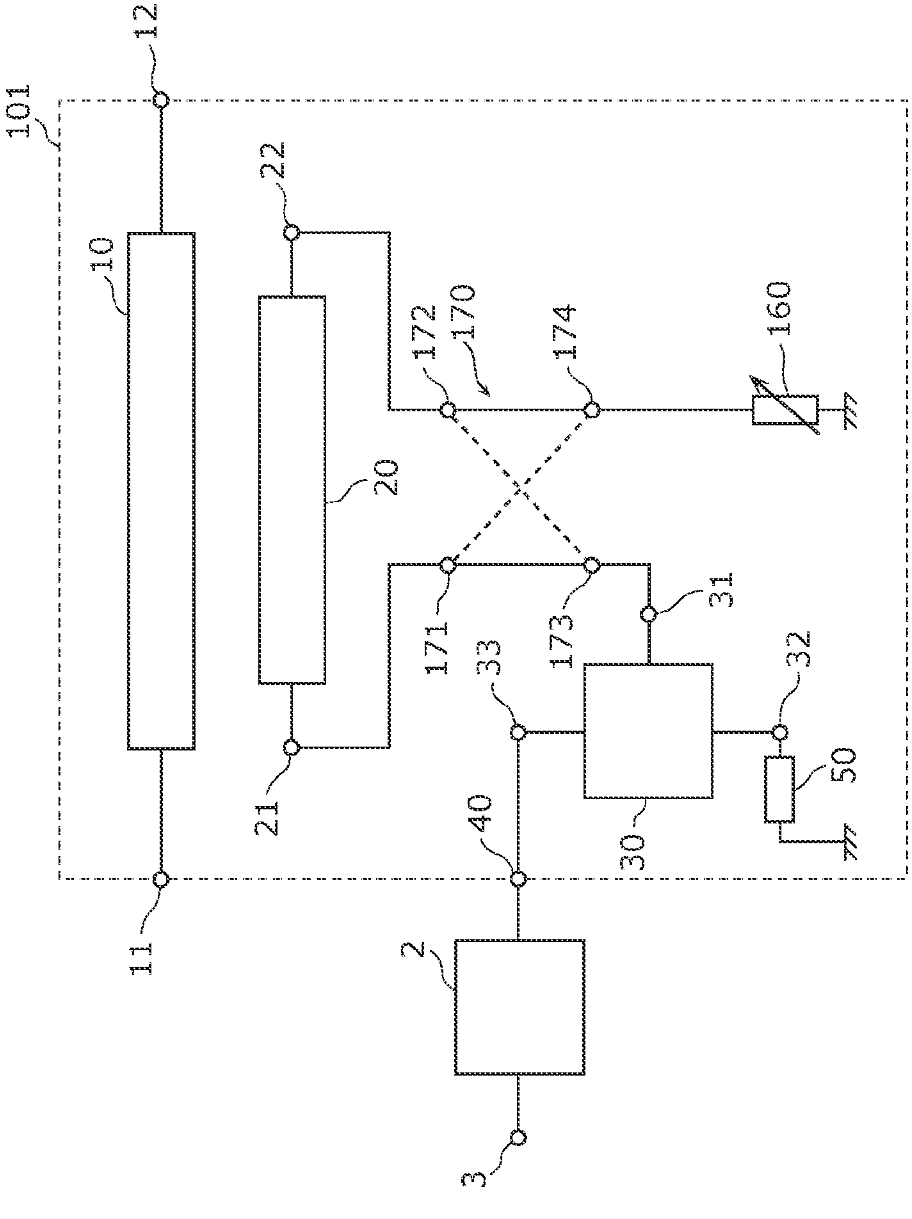
FIG. 8 is a diagram illustrating a configuration of a directional coupler according to Embodiment 2.

First, a configuration of the directional coupler according to Embodiment 2 will be described with reference to FIG. 8. FIG. 8 is a diagram illustrating a configuration of a directional coupler 101 according to the embodiment.

As illustrated in FIG. 8, the directional coupler 101 includes a variable termination circuit 160 instead of the termination circuit 60, as compared with the directional coupler 1 according to Embodiment 1. The directional coupler 101 also includes a switch circuit 170.

The variable termination circuit 160 is an example of a termination circuit connected to another end 22 of a sub line 20. The variable termination circuit 160 is a termination circuit with changeable impedance.

Figure 9:
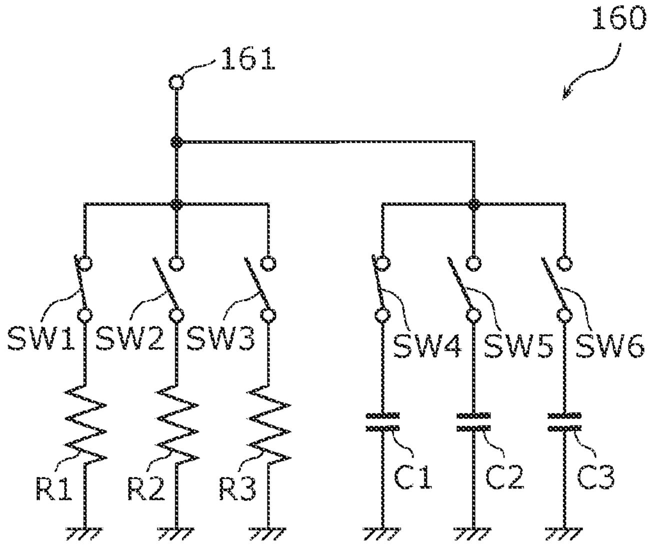
FIG. 9 is a circuit diagram illustrating an example of a variable termination circuit included in the directional coupler according to Embodiment 2.

FIG. 9 is a circuit diagram illustrating an example of the variable termination circuit 160 included in the directional coupler 101 according to the embodiment. As illustrated in FIG. 9, the variable termination circuit 160 includes three resistors R1 to R3, three capacitors C1 to C3, six switches SW1 to SW6, and a terminal 161.

The terminal 161 is connected to the other end 22 of the sub line 20. In the embodiment, the terminal 161 is connected to the other end 22 of the sub line 20 via the switch circuit 170.

The resistors R1 to R3 and the capacitors C1 to C3 are connected in series to the six switches SW1 to SW6, respectively. Three series circuits of the resistors and switches and three series circuits of the capacitors and the switches are connected in parallel between the terminal 161 and the ground.

Resistance values of the resistors R1 to R3 may be equal to or different from each other. Capacitance values of the capacitors C1 to C3 may be equal to or different from each other. One of the three resistors R1 to R3 need not necessarily be connected to a switch. One of the three capacitors C1 to C3 need not necessarily be connected to a switch.

The switches SW1 to SW6 are switching elements such as metal oxide semiconductor field effect transistors (MOSFETs). The switches SW1 to SW6 can be switched on/off (conduction/non-conduction). This allows the impedance of the variable termination circuit 160 to be changed. For example, the switches SW1 to SW6 are adjusted based on the fundamental frequency f0 of the high frequency signals transmitted through the main line 10. To be specific, the on/off of the switches SW1 to SW6 are controlled so that the impedance of the variable termination circuit 160 becomes a value at which the signals with the fundamental frequency f0 can be sufficiently absorbed and consumed by the variable termination circuit 160.

The variable termination circuit 160 may include one or more inductors. The circuit configuration of the variable termination circuit 160 is not limited. The variable termination circuit 160 need not necessarily include resistors or capacitors.

Returning to FIG. 8, the switch circuit 170 is an example of a switch circuit connected between the sub line 20 and the first and second filters. In the embodiment, the switch circuit 170 is also connected between the sub line 20 and the variable termination circuit 160.

Specifically, the switch circuit 170 has four terminals 171 to 174. The terminal 171 is connected to one end 21 of the sub line 20. The terminal 172 is connected to the other end 22 of the sub line 20. The terminal 173 is connected to a common terminal 31 of a diplexer 30. The terminal 174 is connected to the variable termination circuit 160.

The switch circuit 170 switches between a first connection state in which the one end 21 of the sub line 20 is connected to the diplexer 30 and the other end 22 of the sub line 20 is connected to the variable termination circuit 160, and a second connection state in which the one end 21 of the sub line 20 is connected to the variable termination circuit 160 and the other end 22 of the sub line 20 is connected to the diplexer 30. The first connection state is a state in which the terminal 171 and the terminal 173 are connected (conducted) and the terminal 172 and the terminal 174 are connected (conducted), as indicated by solid lines in FIG. 8. The second connection state is a state in which the terminal 171 and the terminal 174 are connected (conducted) and the terminal 172 and the terminal 173 are connected (conducted), as indicated by dashed lines in FIG. 8. Conduction and non-conduction between the terminals of the switch circuit 170 are switched using a switching element such as a MOSFET.

By switching the connection state of the switch circuit 170, the end portion of the sub line 20 connected to the coupling output terminal 40 via the diplexer 30 can be switched between the one end 21 and the other end 22. This enables bidirectional detection in the detector 2. That is, the detector 2 can detect not only fundamental wave signals 80 of the traveling waves but also fundamental wave signals 81 of the reflected waves.

[2-2. Effects, Etc.]

As described above, in the directional coupler 101 according to the embodiment, the termination circuit connected to the other end 22 of the sub line 20 is the variable termination circuit 160.

This allows the variable termination circuit 160 to optimize the matching state for the signals with the fundamental frequency f0 at the other end 22 of the sub line 20. In other words, the directivity of the signals that can be extracted by the directional coupler 101 can be optimized.

On the other hand, reflected unwanted wave signals 90*r* reaching the variable termination circuit 160 are more likely to be reflected by the variable termination circuit 160 than by the normal termination circuit 60. This is because the matching state is optimized for the fundamental frequency f0, so adverse effects such as excessive reactance within other frequency bands (especially harmonic waves) occur.

However, in the directional coupler 101, as in the directional coupler 1 according to Embodiment 1, as illustrated in FIG. 7, the reflected unwanted wave signals 91*r* reflected by the variable termination circuit 160 pass through the sub line 20, then pass through the first filter of the diplexer 30, and are absorbed and consumed by the termination circuit 50. In other words, the reflected unwanted wave signals 91*r* reflected by the variable termination circuit 160 are not reflected by the diplexer 30 and do not return to the sub line 20. The same applies not only to the reflected unwanted wave signals 91*r* but also to the unwanted wave signals 90 based on the traveling waves. That is, multiple reflection based on the unwanted waves can be suppressed regardless of the direction of signals transmitted through the main line 10.

Thus, in the directional coupler 101, although the reflection of the unwanted waves by the variable termination circuit 160 is likely to occur, the first filter of the diplexer 30 is terminated so that the unwanted waves passing through the first filter can be absorbed and consumed, and the desired signals can be extracted through the coupling output terminal 40 with high accuracy. With the directional coupler 101 according to the embodiment, the effect of improving the extraction accuracy of the desired signals due to termination of the first filter of the diplexer 30 can be more effectively exhibited.

For example, the directional coupler 101 further includes the switch circuit 170 connected between the sub line 20 and the first and second filters. For example, the switch circuit 170 switches between the first connection state in which the one end 21 of the sub line 20 is connected to the first filter and the second filter and the other end 22 is connected to the variable termination circuit 160 and the second connection state in which the one end 21 is connected to the variable termination circuit 160 and the other end 22 is connected to the first filter and the second filter.

This allows bidirectional detection to be achieved by the provision of the switch circuit 170.

On the other hand, the switch circuit 170 generates distortions in principle. The distortions that occur often include harmonic waves of the fundamental wave signals 80. However, in the directional coupler 101, the distortions generated in the switch circuit 170 also pass through the first filter of the diplexer 30 and are absorbed and consumed by the termination circuit 50.

Thus, in the directional coupler 101, although distortions due to the switch circuit 170 are likely to occur, the first filter of the diplexer 30 is terminated so that the distortions passing through the first filter can be absorbed and consumed, and the desired signals can be extracted through the coupling output terminal 40 with high accuracy. With the directional coupler 101 according to the embodiment, the effect of improving the extraction accuracy of the desired signals due to termination of the first filter of the diplexer 30 can be more effectively exhibited.

The directional coupler 101 according to the embodiment does not necessarily include the switch circuit 170. That is, the variable termination circuit 160 may be directly connected to the other end 22 of the sub line 20. The directional coupler 101 may include the termination circuit 60 having fixed impedance instead of the variable termination circuit 160. Further, the termination circuit 50 may be a variable termination circuit.

Embodiment 3

Next, Embodiment 3 will be described.

A directional coupler according to Embodiment 3 is, when compared to Embodiment 2, different from that of Embodiment 2 mainly in that two filters are also connected to the other end of the sub line. In the following, differences from Embodiment 2 will be mainly described, and description of common features will be omitted or simplified.

[3-1. Configuration]

Figure 10:
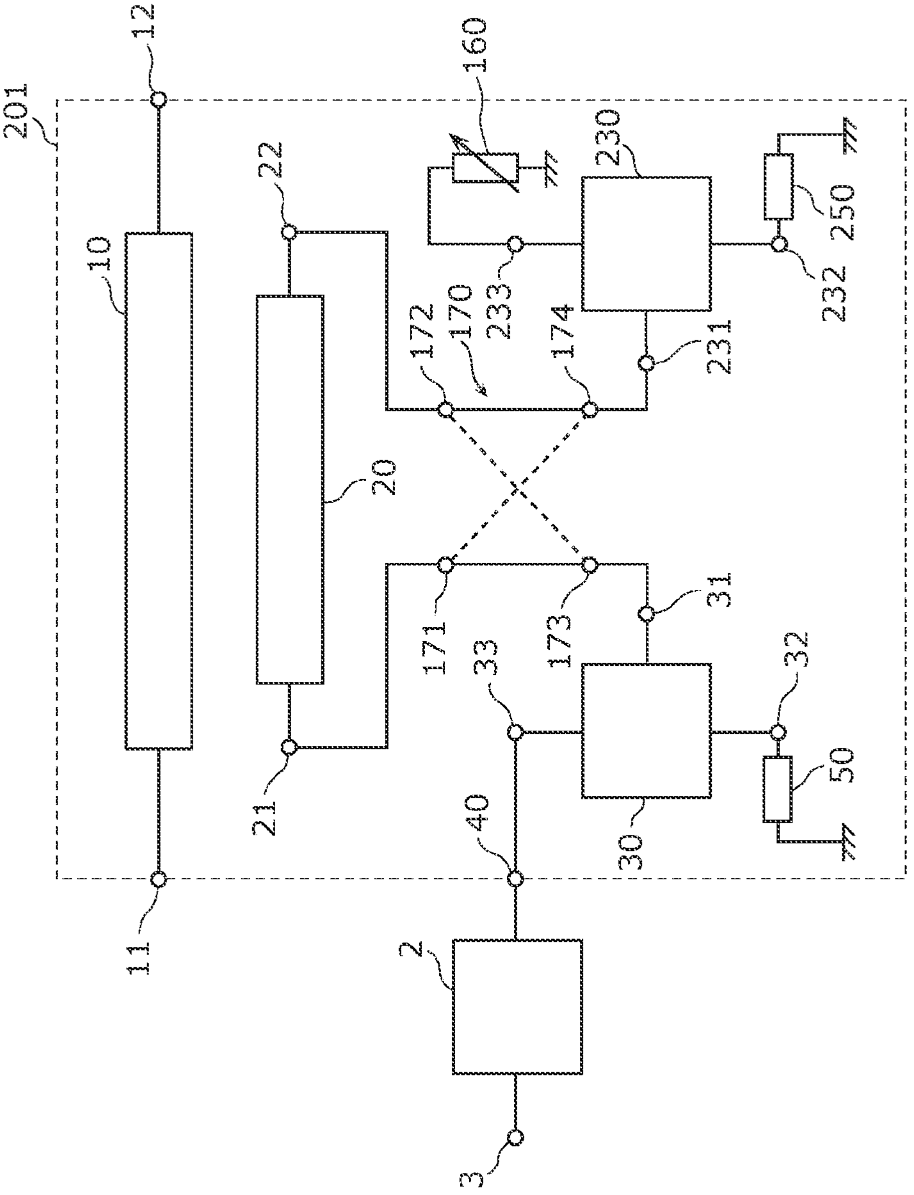
FIG. 10 is a diagram illustrating a configuration of a directional coupler according to Embodiment 3.

First, a configuration of the directional coupler according to Embodiment 3 will be described with reference to FIG. 10. FIG. 10 is a diagram illustrating a configuration of a directional coupler 201 according to the embodiment.

As illustrated in FIG. 10, the directional coupler 201 newly includes a diplexer 230 and a termination circuit 250 as compared with the directional coupler 101 according to Embodiment 2.

The diplexer 230 is an example of a multiplexer including two filters having different pass bands from each other. The diplexer 230 has a common terminal 231, a first output terminal 232, and a second output terminal 233. The common terminal 231 is connected to another end 22 of a sub line 20 via a switch circuit 170. The first output terminal 232 is connected to the termination circuit 250. The second output terminal 233 is connected to a variable termination circuit 160. The diplexer 230 is configured to allow only signals within specific frequency bands to pass between the common terminal 231 and the first output terminal 232 and between the common terminal 231 and the second output terminal 233, respectively.

A third filter connected to the other end 22 of the sub line 20 is disposed between the common terminal 231 and the first output terminal 232. The third filter is terminated by the termination circuit 250. In the embodiment, the third filter is directly connected to the termination circuit 250. The third filter is configured to pass signals with frequencies other than the fundamental frequency f0 and cut off signals with the fundamental frequency f0.

A fourth filter having a pass band different from that of the third filter is disposed between the common terminal 231 and the second output terminal 233. The fourth filter is connected to the other end 22 of the sub line 20 and the variable termination circuit 160. The fourth filter is configured to pass signals with the fundamental frequency f0 and cut off signals with frequencies other than the fundamental frequency f0.

The diplexer 230 has, for example, the same configuration as the diplexer 30 illustrated in FIG. 2. Specifically, the third filter is the high pass filter 30H and the fourth filter is the low pass filter 30L. The frequency characteristics of the two filters of the diplexer 230 are the same as those of the diplexer 30.

Alternatively, the diplexer 230 may have the same configuration as the diplexer 30*a* illustrated in FIG. 4. Specifically, the third filter may be the band pass filter 30B and the fourth filter may be the band elimination filter 30E. The two filters of the diplexer 230 may have the same frequency characteristics as those of the diplexer 30*a*.

The termination circuit 250 is connected to the first output terminal 232 of the diplexer 230. The termination circuit 250 is adjusted to a predetermined value so that the signals that pass through the third filter of the diplexer 230 can be absorbed and consumed. The termination circuit 250 may be a variable termination circuit.

[3-2. Signal Flow in Directional Coupler]

Next, the signal flow in the directional coupler 201 according to the embodiment will be described. In the following, the signal flow, especially around the diplexer 230, will be described with reference to FIG. 11.

Figure 11:
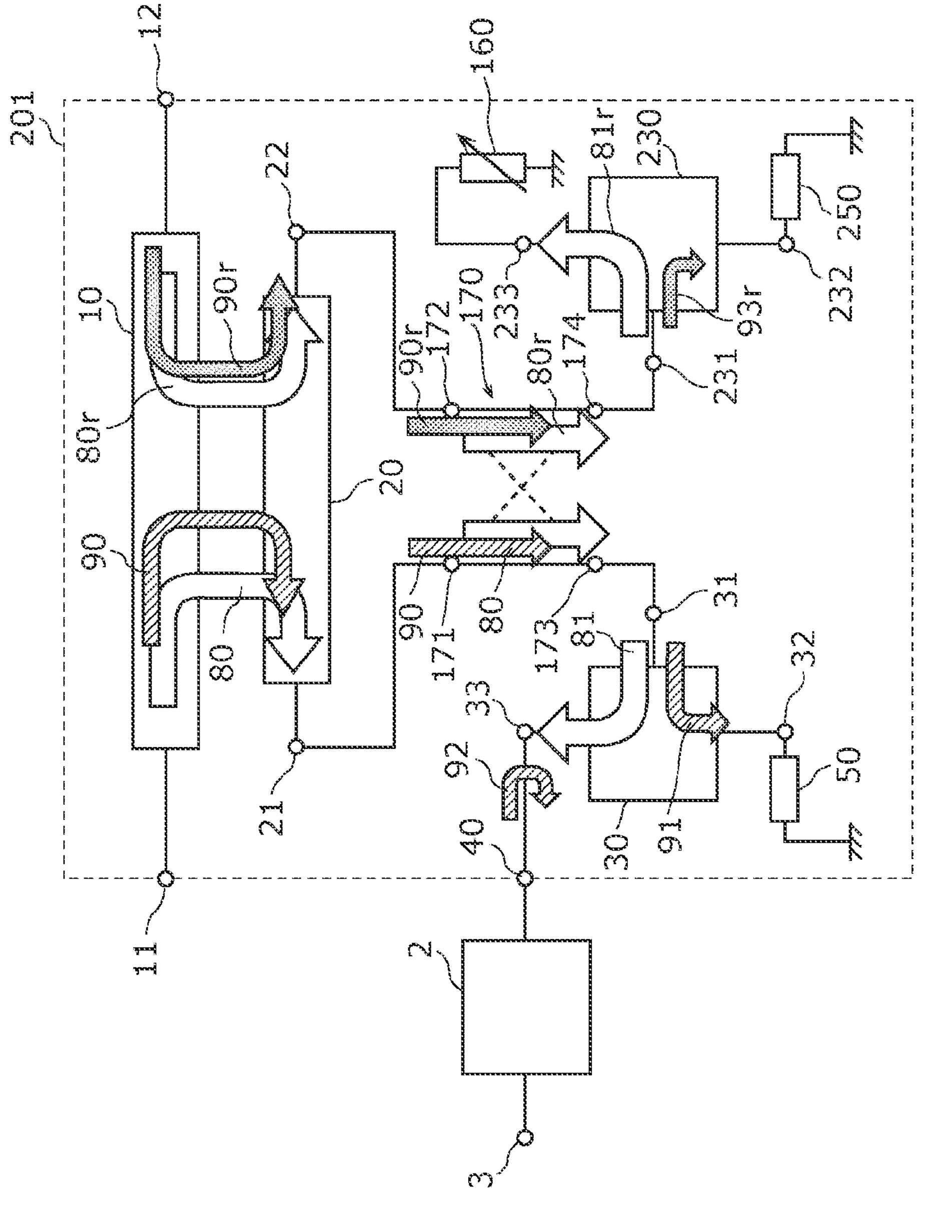
FIG. 11 is a diagram for explaining signals flowing through the directional coupler according to Embodiment 3.

FIG. 11 is a diagram for explaining signals flowing in the directional coupler 201 according to the embodiment. As in Embodiments 1 and 2, as illustrated in FIG. 11, reflected fundamental wave signals 80*r* and reflected unwanted wave signals 90*r* flow through the other end 22 of the sub line 20 toward the diplexer 230. The reflected fundamental wave signals 80*r* pass through the third filter of the diplexer 230. Reflected fundamental wave signals 81*r* after passing through the third filter are absorbed and consumed by the variable termination circuit 160 via the second output terminal 233. Thus, the reflected fundamental wave signals 81*r* do not return to the sub line 20.

The reflected unwanted wave signals 90*r* pass through the fourth filter of the diplexer 230. Reflected unwanted wave signals 93*r* after passing through the fourth filter reach the termination circuit 250 via the first output terminal 232. The termination circuit 250 is configured to terminate the reflected unwanted wave signals 93*r*, so that the reflected unwanted wave signals 93*r* are absorbed and consumed without necessarily being reflected. In other words, the reflected unwanted wave signals 93*r* are not reflected by the common terminal 231 of the diplexer 230, so the multiple reflection as described with reference to FIG. 6 does not occur. Thus, deterioration of the filter characteristics can be suppressed, and the desired signals can be extracted through the coupling output terminal 40 with high accuracy.

[3-3. Effects, Etc.]

As described above, the directional coupler 201 according to the embodiment further includes the third filter connected to the other end 22 of the sub line 20, and the fourth filter connected to the other end 22 of the sub line 20 and the termination circuit 250 and having the pass band different from that of the third filter, and the third filter is terminated.

This suppresses reflections of both signals with the fundamental waves and the unwanted waves on the other end 22 side of the sub line 20. Thus, multiple reflection that may occur in the sub line 20 can be suppressed, and deterioration of the filter characteristics of the diplexer 30 can be suppressed. Thus, the desired signals can be extracted through the coupling output terminal 40 with high accuracy.

(Modifications)

Hereinafter, modifications of the above-described embodiments will be described.

For example, in each embodiment, a switch may be connected to the output terminals of each of the plurality of filters to switch the connection destinations of the output terminals. For example, a switch may be provided between the output terminals of each of the plurality of filters and the coupling output terminal 40, and the connection between the filters and the coupling output terminal 40 may be switched by the switch. This allows the detector 2 to detect signals of different frequency bands from each other.

Figure 12:
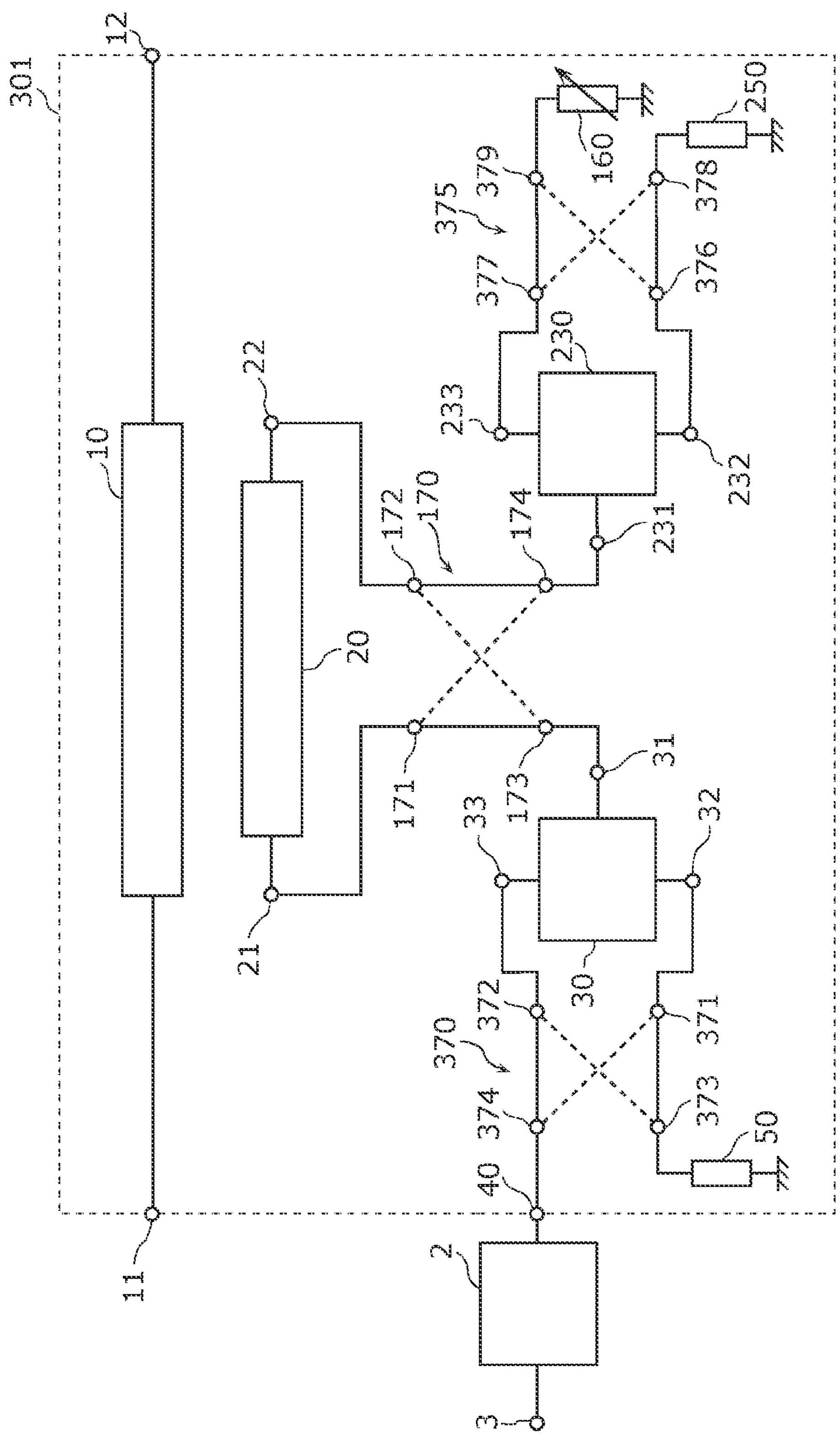
FIG. 12 is a diagram illustrating a configuration of a directional coupler according to a modification of the embodiment.

FIG. 12 is a diagram illustrating a configuration of a directional coupler 301 according to one modification. The directional coupler 301 illustrated in FIG. 12 is different from the directional coupler 201 according to Embodiment 3 in that switch circuits 370 and 375 are newly provided.

The switch circuit 370 is connected between a diplexer 30 and a coupling output terminal 40. The switch circuit 370 is also connected between the diplexer 30 and a termination circuit 50.

Specifically, the switch circuit 370 has four terminals 371 to 374. The terminal 371 is connected to a first output terminal 32 of the diplexer 30. The terminal 372 is connected to a second output terminal 33 of the diplexer 30. The terminal 373 is connected to the termination circuit 50. The terminal 374 is connected to the coupling output terminal 40.

The switch circuit 370 switches between a third connection state in which the first output terminal 32 of the diplexer 30 is connected to the termination circuit 50 and the second output terminal 33 of the diplexer 30 is connected to the coupling output terminal 40 and a fourth connection state in which the first output terminal 32 of the diplexer 30 is connected to the coupling output terminal 40 and the second output terminal 33 of the diplexer 30 is connected to the termination circuit 50. The third connection state is a state in which the terminal 371 and the terminal 373 are connected (conducted) and the terminal 372 and the terminal 374 are connected (conducted), as indicated by solid lines in FIG. 12. The fourth connection state is a state in which the terminal 371 and the terminal 374 are connected (conducted) and the terminal 372 and the terminal 373 are connected (conducted), as indicated by dashed lines in FIG. 12. Conduction and non-conduction between the terminals of the switch circuit 370 are switched using a switching element such as a MOSFET.

The switch circuit 370 switches the filter to be connected to the detector 2 by switching the connection state. Thus, the frequency to be detected is switched.

The switch circuit 375 is connected between a diplexer 230 and a variable termination circuit 160. The switch circuit 375 is also connected between the diplexer 230 and a termination circuit 250.

Specifically, the switch circuit 375 has four terminals 376 to 379. The terminal 376 is connected to a first output terminal 232 of the diplexer 230. The terminal 377 is connected to a second output terminal 233 of the diplexer 230. The terminal 378 is connected to the termination circuit 250. The terminal 379 is connected to the variable termination circuit 160.

The switch circuit 375 switches between a fifth connection state in which the first output terminal 232 of the diplexer 230 is connected to the termination circuit 250 and the second output terminal 233 of the diplexer 230 is connected to the variable termination circuit 160 and a sixth connection state in which the first output terminal 232 of the diplexer 230 is connected to the variable termination circuit 160 and the second output terminal 233 of the diplexer 230 is connected to the termination circuit 250. The fifth connection state is a state in which the terminal 376 and the terminal 378 are connected (conducted), and the terminal 377 and the terminal 379 are connected (conducted), as indicated by solid lines in FIG. 12. The sixth connection state is a state in which the terminal 376 and the terminal 379 are connected (conducted) and the terminal 377 and the terminal 378 are connected (conducted), as indicated by dashed lines in FIG. 12. Conduction and non-conduction between the terminals of the switch circuit 375 are switched using a switching element such as a MOSFET.

The switch circuit 375 is in the fifth connection state when the switch circuit 370 is in the third connection state, as indicated by the solid lines in FIG. 12. As in Embodiment 3, this allows reflected fundamental wave signals 81*r* and reflected unwanted wave signals 93*r* to be absorbed and consumed by the variable termination circuit 160 and the termination circuit 250, respectively. The switch circuit 375 is in the sixth connection state when the switch circuit 370 is in the fourth connection state, as indicated by the dashed lines in FIG. 12.

The termination circuit 50 may be a variable termination circuit. The impedance of the variable termination circuit is changed according to the filter to be connected. This suppresses reflection of signals other than the signals to be detected, by the diplexer 30, thereby improving extraction accuracy of the signals to be detected. Alternatively, a termination circuit adjusted to an appropriate value may be connectable for each filter. The switch circuit 370 may connect a filter that is not connected to the coupling output terminal 40 to a corresponding termination circuit. The same applies to the termination circuit 250 and the switch circuit 375.

Note that the directional coupler 301 may include only one of the switch circuits 370 and 375. For example, the directional coupler 301 does not necessarily include the diplexer 230, the variable termination circuit 160, and the switch circuit 375, as in the directional coupler 1 or 101 according to Embodiment 1 or 2. As with the directional coupler 1 according to Embodiment 1, the directional coupler 301 does not necessarily include the switch circuit 170.

OTHERS

Although the directional coupler according to the present disclosure has been described above based on the above-described embodiments and the like, the present disclosure is not limited to the above-described embodiments.

For example, although an example in which the directional coupler 1, 101, 201, or 301 includes the diplexer 30 has been described in each of the embodiments, the present disclosure is not limited thereto. For example, the directional coupler 1, 101, 201, or 301 may include a triplexer having three filters or a multiplexer. The plurality of filters need not necessarily be constituent elements of a diplexer, a triplexer, or a multiplexer. The plurality of filters may be provided individually. When three or more filters are provided, the filters other than the filter connected to the detector 2 are each terminated.

At least one of the high pass filter 30H, the low pass filter 30L, the band pass filter 30B, and the band elimination filter 30E may be tunable. That is, at least one of the high pass filter 30H, the low pass filter 30L, the band pass filter 30B, and the band elimination filter 30E may be capable of changing the pass band. For example, a switch or a varactor is used for tuning, but others can be used.

For example, the two filters included in the directional coupler 1, 101, 201, or 301 may be two types of filters selected from the high pass filter 30H, the low pass filter 30L, the band pass filter 30B, and the band elimination filter 30E. Specifically, the directional coupler 1, 101, 201, or 301 may include the low pass filter 30L and the band pass filter 30B or the band elimination filter 30E. Alternatively, the directional coupler 1, 101, 201, or 301 may include the high pass filter 30H and the band pass filter 30B or the band elimination filter 30E.

For example, the corner frequencies of the two filters may be different from each other. For example, the corner frequency f1 of the low pass filter 30L may be smaller than the corner frequency fh of the high pass filter 30H. This suppresses the overlap of the pass bands of the low pass filter 30L and the high pass filter 30H, thereby improving the separation accuracy between the fundamental wave signals 81 and the unwanted wave signals 91. Alternatively, the corner frequency cl of the low pass filter 30L may be larger than the corner frequency fh of the high pass filter 30H. This eliminates a frequency band that is not included in the pass bands of either the low pass filter 30L or the high pass filter 30H, thereby sufficiently suppressing the unwanted wave signals 91*x*.

Similarly, the corner frequencies of the band pass filter 30B and the band elimination filter 30E may be different from each other. For example, the corner frequency fe1 of the band elimination filter 30E may be smaller or larger than the corner frequency fb1 of the band pass filter 30B. The corner frequency fe2 of the band elimination filter 30E may be smaller or larger than the corner frequency fb2 of the band pass filter 30B.

For example, the directional coupler 1, 101, 201, or 301 may include a plurality of sub lines 20. A line selector switch for switching to one of the sub lines 20 may be provided between the one end 21 of each of the plurality of sub lines 20 and the diplexer 30. The line selector switch is an example of a switch circuit connected between the sub lines 20 and the diplexer 30. The line selector switch can select and switch a sub line to be connected to the common terminal of the diplexer from among the plurality of sub lines 20.

For example, the directional coupler 1, 101, 201, or 301 does not necessarily include at least one of the termination circuits 50 and 250. For example, the directional coupler 1, 101, 201, or 301 may include an external connection terminal connected to the first output terminal 32 of the diplexer 30 or 30*a* or the first output terminal 232 of the diplexer 230. The termination circuit 50 or 250 for terminating the first filter or the third filter may be connected to the external connection terminal.

In addition, the present disclosure also includes configurations obtained by applying various modifications conceivable by a person skilled in the art to the embodiments described above and configurations obtained by appropriately combining the constituent elements and functions in the embodiments described above without necessarily departing from the gist of the present disclosure.

INDUSTRIAL APPLICABILITY

The present disclosure can be widely used in electronic devices and communication devices including directional couplers.

REFERENCE SIGNS LIST

- 1, 101, 201, 301 DIRECTIONAL COUPLER
- 2 DETECTOR
- 3 DETECTION RESULT OUTPUT TERMINAL
- 10 MAIN LINE
- 11, 12 INPUT/OUTPUT TERMINAL
- 20 SUB LINE
- 21 ONE END
- 22 ANOTHER END
- 30, 30*a*, 230 DIPLEXER
- 30B BAND PASS FILTER
- 30E BAND ELIMINATION FILTER
- 30H HIGH PASS FILTER
- 30L LOW PASS FILTER
- 31, 231 COMMON TERMINAL
- 32, 232 FIRST OUTPUT TERMINAL
- 33, 233 SECOND OUTPUT TERMINAL
- 40 COUPLING OUTPUT TERMINAL
- 50, 60, 250 TERMINATION CIRCUIT
- 80, 81 FUNDAMENTAL WAVE SIGNAL
- 80*r*, 81*r* REFLECTED FUNDAMENTAL WAVE SIGNAL
- 90, 91 UNWANTED WAVE SIGNAL
- 90*r*, 91*r*, 93*r* REFLECTED UNWANTED WAVE SIGNAL
- 92 DISTORTION SIGNAL
- 92*r* REFLECTED UNWANTED WAVE COUPLED SIGNAL
- 160 VARIABLE TERMINATION CIRCUIT
- 161, 171, 172, 173, 174, 371, 372, 373, 374, 376, 377, 378, 379 TERMINAL
- 170, 370, 375 SWITCH CIRCUIT
- C1, C2, C3 CAPACITOR
- R1, R2, R3 RESISTOR
- SW1, SW2, SW3, SW4, SW5, SW6 SWITCH

The invention claimed is:

1. A directional coupler comprising:
- a main line;
- a sub line electromagnetically coupled to the main line;
- an output terminal;
- a first filter connected to a first end of the sub line; and
- a second filter connected to the first end of the sub line and the output terminal, the second filter having a pass band that is different than a pass band of the first filter,
- wherein the first filter and the second filter are constituent elements of a multiplexer,
- wherein the first filter is terminated, and
- wherein a corner frequency of the first filter is equal to a corner frequency of the second filter.

2. The directional coupler according to claim 1, further comprising:
- a termination circuit connected to a second end of the sub line.

3. The directional coupler according to claim 2, wherein the termination circuit is a variable termination circuit.

4. The directional coupler according to claim 2, further comprising:
- a switch circuit connected between the sub line and the first filter and the second filter.

5. The directional coupler according to claim 4, wherein the switch circuit is configured to switch between:
- a first connection state in which the first end of the sub line is connected to the first filter and the second filter, and the second end of the sub line is connected to the termination circuit, and
- a second connection state in which the first end of the sub line is connected to the termination circuit, and the second end of the sub line is connected to the first filter and the second filter.

6. The directional coupler according to claim 2, further comprising:
- a third filter connected to the second end of the sub line; and
- a fourth filter connected to the second end of the sub line and the termination circuit, the fourth filter having a pass band that is different than a pass band of the third filter,
- wherein the third filter is terminated.

7. The directional coupler according to claim 6, wherein the first filter, the second filter, the third filter, and the fourth filter are constituent elements of a diplexer.

8. The directional coupler according to claim 2, wherein the first filter is directly connected to a second termination circuit.

9. The directional coupler according to claim 1, wherein the first filter and the second filter are constituent elements of a diplexer.

10. The directional coupler according to claim 1, wherein the first filter is directly connected to a termination circuit.

11. The directional coupler according to claim 1, wherein the pass band of the first filter comprises higher frequencies than the pass band of the second filter.

* * * * *